Dec. 10, 1929.  E. MOCIGEMBA  1,738,602
GEAR PUMP OR ENGINE
Filed Aug. 15, 1927

Inventor:
Emanuel Mocigemba
by
Atty.

Patented Dec. 10, 1929

1,738,602

UNITED STATES PATENT OFFICE

EMANUEL MOCIGEMBA, OF ESSEN, GERMANY

GEAR PUMP OR ENGINE

Application filed August 15, 1927, Serial No. 213,004, and in Germany November 19, 1925.

My invention relates to gear pumps or engines in which two rotors having suitable projections cooperate to convey a liquid or fluid or, in the case of an engine, are rotated by such liquid or fluid. More particularly my invention relates to that type of pump or engine in which the projections or ribs of the rotor are arranged in pairs so as to form flow chambers between them, one of the ribs in each pair forming part of one rotor and the other rib forming part of the mating rotor, and the ribs being provided with shoulders projecting into the flow chambers.

It is an object of my invention to improve a pump or engine of the type referred to and to this end I equip each rib with shoulders which are staggered with respect to those of the mating rib. By staggering the shoulders I prevent restriction of the area available for the flow and deflect the flow gradually from one flow chamber into the other, so that shocks and energy losses are eliminated.

In pumps of this type as heretofore designed the shoulders are not staggered, so that the area is restricted and the flow is suddenly deflected. These drawbacks are overcome according to my invention.

Preferably the shoulders are curved like the faces of gear teeth, so that they will cooperate properly and the gears provided for connecting the rotors are much relieved. It is even possible to design the rotors for permanent mesh, so that connecting gears can be entirely eliminated.

The rotors are preferably built up from a solid cylinder, and the ribs are made separately from a hollow cylinder, and secured on the solid cylinder. This method of manufacture is preferred as it is cheap, simple and exact, but obviously the ribs, if desired, may be built up from plates or annular sections of suitable configuration.

In the case of a fluid, a liquid is introduced for preventing leakage of the fluid at the clearances intermediate the rotors and the casing, this liquid being circulated continuously and, at the same time, cooling and lubricating the rotating parts.

In the drawings accompanying this specification and forming part thereof a pump embodying my invention is illustrated diagrammatically by way of example, but it is understood that the new mechanism may also operate as an engine if liquid or fluid under pressure is supplied to what in a pump is the suction passage.

In the drawings

Figure 1:
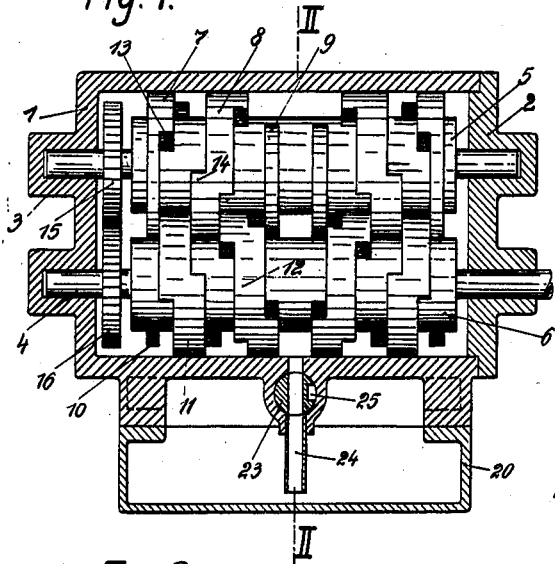
Fig. 1 is a section of the pump along the axes of its two rotors.

Referring to the drawings, 1 is the casing of the pump which is formed with an integral end plate at one end and with a detachable end plate 2 at the other end, and 3 and 4 are the shafts of the rotors which are supported in suitable bearings in the end plates. The shaft 4 is extended beyond the end plate 2 for the reception of suitable operating mechanism (not shown). Each rotor is built up from a solid cylinder 5 and 6 which is secured on or integral with its shaft 3 and 4, respectively. 7, 8, 9, and 10, 11, 12 are the ribs constituting one unit on one end of the cylinders 5 and 6, respectively. The ribs of the unit on the other end of the cylinder are arranged symmetrically with respect to the ribs of the first unit. In all other respects the second unit is quite similar to the first unit and need not be described.

I may provide any number of units on their respective rotors instead of two as shown, and I am not limited to a definite number of ribs in each unit.

The ribs are provided with shoulders, for instance shoulders 13 and 14 at the ribs 7 and 8 of the first unit of the upper rotor. The shoulders are staggered so that the area between them is not restricted as compared with the area intermediate the parallel surfaces of the ribs and the flow is deflected gradually without shocks and loss of energy, as described.

Rotation is imparted to the shaft 4 by any of the above mentioned mechanisms, and its rotation is transferred to the shaft 3 by a pair of gears 15, 16, but, as mentioned, the gears may be dispensed with if provision is made for having the shoulders on both rotors in permanent mesh. If they are not meshing permanently, they are preferably shaped like gear teeth notwithstanding, so that they will relieve the stress on the gear 15, 16 as long as they are meshing.

17 is the suction and 18 is the delivery passage. As indicated by the arrows in Fig. 3 the flow from the suction passage 17—which would be the inlet in an engine—is deflected to either side of a partition 19 in the casing 1, so that it is admitted to the rotors at both ends and conveyed to the centre of the pump in opposite direction. The streams meet at the point opposite the delivery passage 18—the exhaust in an engine—and are discharged from the casing as a single flow.

Figure 6:
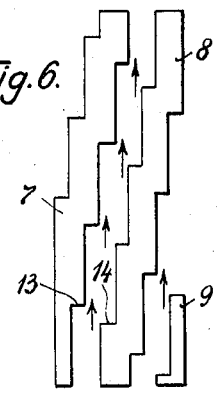
Fig. 6 is a development of the ribs constituting a unit.

As mentioned, the flow intermediate the several parallel flow chambers constituted by the faces of the units occurs substantially on a straight line without deflection as indicated by the arrows in Fig. 6. With the suction and delivery passages 17 and 18 arranged as illustrated, the rotors will rotate as indicated by the arrows in Fig. 2. The two cooperating rotors form chambers intermediate their units which exert suction at the passage 17 and convey the medium toward the centre until it is discharged at the delivery passage 18. The pressures are equal in axial and radial directions so that the forces acting on the rotors are balanced and the rotors will rotate practically without friction.

Instead of having parallel faces as shown, the ribs may be constructed with inclined faces, and in a pump or an engine which conveys or is operated by fluid the section of the chambers between two ribs is preferably reduced toward the discharge side.

Figure 2:
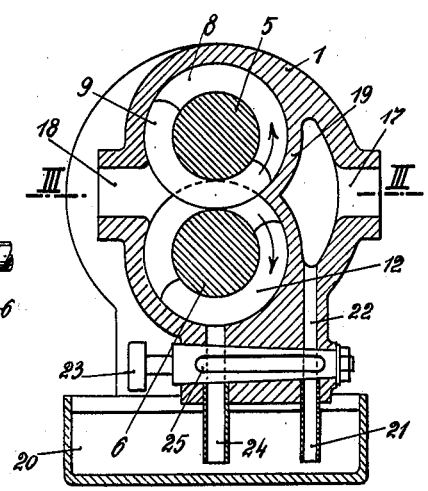
Fig. 2 is a section on the line II—II in Fig. 1.
Figure 3:
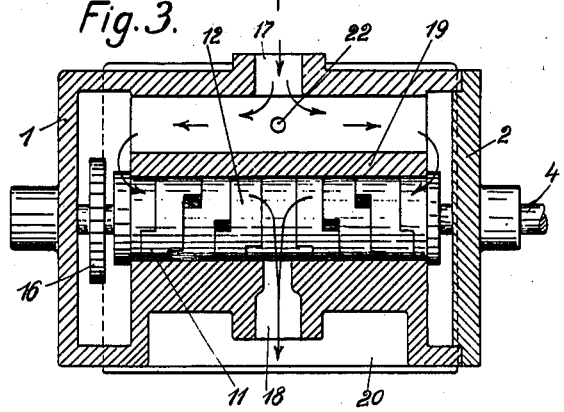
Fig. 3 is a section on the line III—III in Fig. 2.
Figure 4:
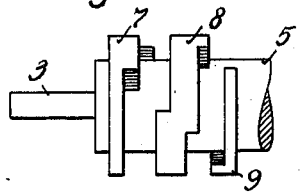
Fig. 4 shows one of the rib units separately.
Figure 5:
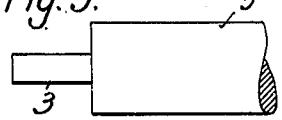
Fig. 5 shows the corresponding portion of the solid cylinder on which the rib units are secured to constitute a complete rotor.

In the case of a fluid pump, for instance a compressor, means must be provided for preventing leakage within the pump. Such means are illustrated in Figs. 1, 2 and 3. 20 is a liquid reservoir from which liquid is drawn into the suction chamber through a pipe 21 and a passage 22. A cock or other suitable valve 23 serves for closing or restricting the liquid passage. The liquid is drawn into the pump with the air and serves for preventing leakage, and also as a lubricant and coolant. After having circulated in the pump, the liquid is returned to the reservoir 20 through a pipe 24 at the bottom of the lower rotor. Any air that may have been entrained escapes at the open upper end of the reservoir 20.

A parallel recess 25 is formed in the cock 23, and by turning the cock through 90 degrees anti-clockwise from the position shown in Figs. 1 and 2, the connection between the reservoir 20 and the inside of the casing is interrupted, so that the liquid will circulate in the casing and not between the casing and the reservoir 20.

For an engine operated by a fluid, a separate pump, not shown, is provided for supplying liquid to the casing.

I wish it to be understood that I do not desire to be limited to the exact details of construction shown and described for obvious modifications will occur to a person skilled in the art.

I claim:—

1. A gear pump or engine comprising a casing, a pair of rotors in said casing, interengaging ribs on each rotor constituting flow chambers between them, staggered shoulders projecting from the face of each of the ribs constituting said flow chambers, a liquid reservoir, a pipe connected with said reservoir and the suction chamber in said casing, a pipe connected with said reservoir and the delivery chamber in said casing, and a cock connected with both pipes and defining a longitudinal groove adapted to connect with each other the pipes intermediate said suction and delivery chambers while their connection with said liquid reservoir is broken by said cock.

2. A gear pump or engine comprising a casing, a pair of rotors in said casing, interengaging ribs on each rotor constituting flow chambers between them, staggered shoulders projecting from the face of each of the ribs constituting said flow chambers, a liquid reservoir, a pipe connected with said reservoir and the suction chamber in said casing, a pipe connected with said reservoir and the delivery chamber in said casing and means adapted to connect with each other the pipes intermediate said suction and delivery chambers.

In testimony whereof I affix my signature.

EMANUEL MOCIGEMBA.